United States Patent
Zou et al.

(10) Patent No.: US 8,032,682 B2
(45) Date of Patent: Oct. 4, 2011

(54) SYSTEM AND METHOD FOR DEVICE RESOURCE ALLOCATION AND RE-BALANCE

(75) Inventors: Yong Colin Zou, Beijing (CN); Wesley M. Shao, Menlo Park, CA (US); Govinda Tatti, Menlo Park, CA (US)

(73) Assignee: Oracle America, Inc., Redwood City, CA (US)

( * ) Notice: Subject to any disclaimer, the term of this patent is extended or adjusted under 35 U.S.C. 154(b) by 22 days.

(21) Appl. No.: 12/501,817

(22) Filed: Jul. 13, 2009

(65) Prior Publication Data

US 2011/0010478 A1 Jan. 13, 2011

(51) Int. Cl.
*G06F 13/00* (2006.01)

(52) U.S. Cl. ........ 710/302; 710/301; 710/303; 710/304; 710/240; 713/2

(58) Field of Classification Search .......... 710/301–306, 710/240–244; 713/2; 711/169
See application file for complete search history.

(56) References Cited

U.S. PATENT DOCUMENTS

| | | | |
|---|---|---|---|
| 6,421,755 B1* | 7/2002 | Rao ............................... | 710/302 |
| 6,963,947 B2 | 11/2005 | Piatetsky et al. | |
| 2002/0156945 A1* | 10/2002 | Takada .............................. | 710/8 |
| 2007/0088943 A1* | 4/2007 | Phelps et al. ...................... | 713/2 |
| 2007/0233928 A1* | 10/2007 | Gough .......................... | 710/301 |

FOREIGN PATENT DOCUMENTS

WO 0144935 A1 6/2001

OTHER PUBLICATIONS

European Search Report for corresponding European Application No. 10169164.0, mailed Oct. 18, 2010, 6 pages.

* cited by examiner

*Primary Examiner* — Kim T Huynh
(74) *Attorney, Agent, or Firm* — Brooks Kushman P.C.

(57) ABSTRACT

In at least one embodiment, an apparatus for providing resources from a plurality of on-board device nodes to a hot-plugged device node in a computer is provided. The apparatus comprises a resource manager configured to receive a resource request over a bus system indicative of a set of desired resources from the hot-plugged device node. The resource manager is further configured to probe a parent device and at least one upper level device node positioned above the parent device node for the set of desired resources. The resource manager is further configured to provide the set of desired resources from the parent device node and one or more nodes of the at least one upper level device node over the bus system for transmission to the hot-plugged device node to enable the hot-plugged device node to operate in the intended manner.

18 Claims, 4 Drawing Sheets

SYSTEM AND METHOD FOR DEVICE RESOURCE ALLOCATION AND RE-BALANCE

BACKGROUND

1. Technical Field

One or more embodiments of the present invention generally relate to a system and method for allocating resources for a hot-plugged device or for re-balancing resources for existing devices to support resources needed for the hot-plugged device.

2. Background Art

For Peripheral Component Interconnect (PCI) or PCI express (or PCIe) devices that are operably coupled to a PCI bus in a computer system, such devices may not function if these devices are not allocated proper resources. The resources may include input/output (I/O) addresses, memory addresses, bus numbers, etc. When a computer is powered on, a basic input/output system (BIOS) may allocate the resources for all on-board (or existing) devices and reserve a limited amount of resources for newly inserted devices (or hot-plugged devices).

In some cases, if the device is hot-plugged when the computer system is running, the system probes resource requirements requested by the hot-plugged device so that the system can allocate the identified resources from the existing devices for the hot-plugged device. At times, there may not be enough resources available from the existing devices that can be allocated to the hot-plugged device. In such cases, the hot-plugged device may not operate in the manner desired by the user.

On a Solaris® based computer system, the BIOS (or Open Boot program (OBP)) probes or programs the devices already coupled to the system and assigns such devices resources when the system is powered on. After which, an operating system (OS) boot code reads a configuration space for the devices one by one and collects the information of assigned resources and then calculates the various available resources. The properties which describe the various resources for each device are setup based on the information that is collected and calculated. After the properties for each device are established, a resource manager generates a global linked list so that available resources can be identified by a newly plugged or hot-plugged device. However, when a device is hot-plugged into the system and there are not enough resources available for such a device at the device's immediate parent node, conventional resource managers may fail the resource allocation. Further, the properties for each existing device that has resources allocated or given to the hot-plugged device may not be updated to reflect that such resources are now assigned to the hot-plugged device.

SUMMARY

In at least one embodiment, an apparatus for providing resources from a plurality of on-board device nodes to a hot-plugged device node in a computer is provided. The apparatus comprises a resource manager configured to receive a resource request over a bus system indicative of a set of desired resources from the hot-plugged device node. The resource manager is further configured to probe a parent device and at least one upper level device node positioned above the parent device node for the set of desired resources. The resource manager is further configured to provide the set of desired resources from the parent device node and one or more nodes of the at least one upper level device node over the bus system for transmission to the hot-plugged device node to enable the hot-plugged device node to operate in the intended manner.

BRIEF DESCRIPTION OF THE DRAWINGS

The embodiments of the present invention are pointed out with particularity in the appended claims. However, other features of the various embodiments will become more apparent and will be best understood by referring to the following detailed description in conjunction with the accompany drawings in which:

DETAILED DESCRIPTION

Detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
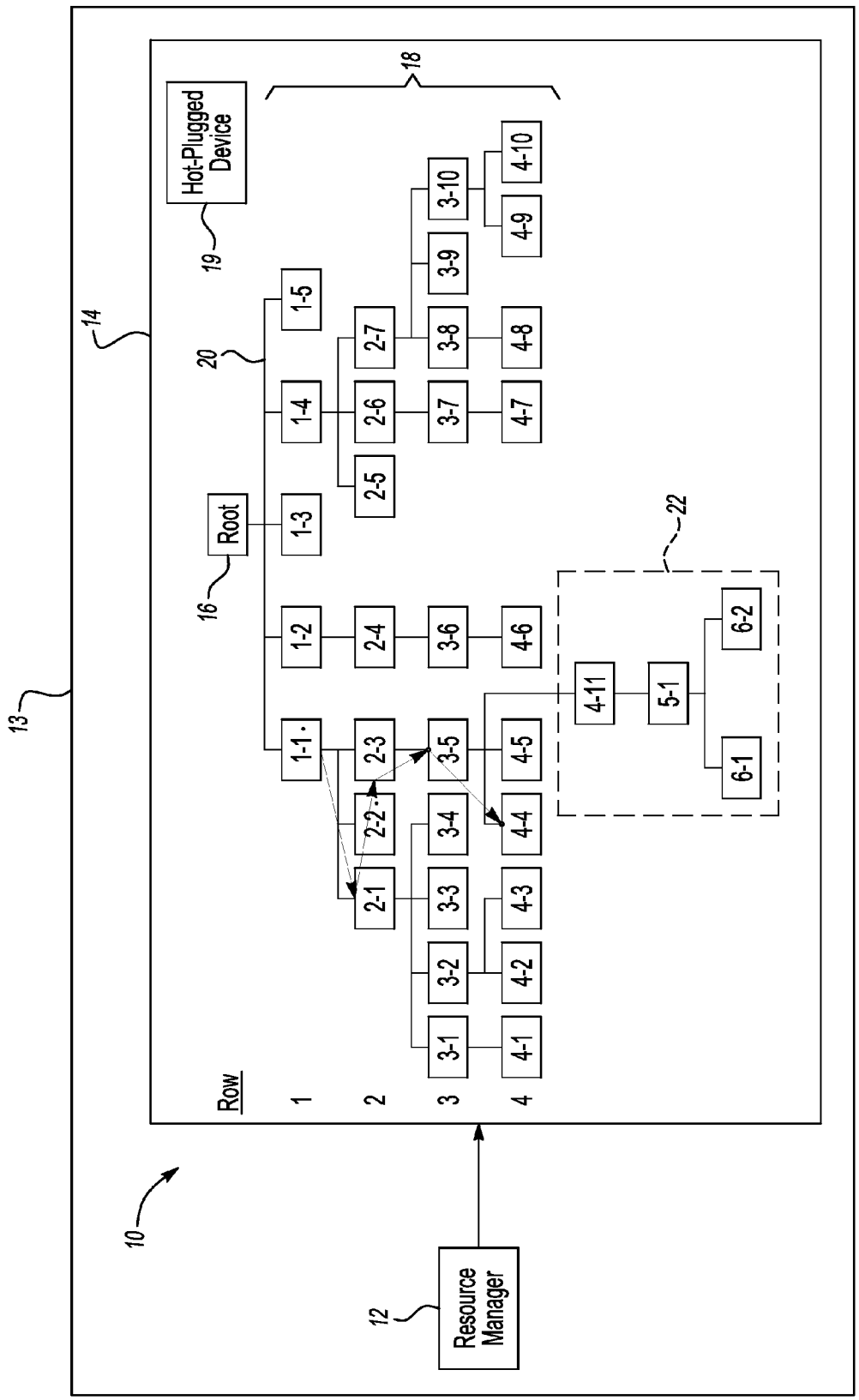
FIG. 1 depicts a system for allocating and re-balancing resources in accordance to one embodiment of the present invention.

FIG. 1 depicts a system 10 for allocating and re-balancing resources in a computer 13 in accordance to one embodiment of the present invention. The system 10 includes a resource manager 12 and a device tree 14. In one example, the resource manager 12 may include, but not limited to, any number of microprocessors, ASICs, ICs, memory devices, and software code that coact with one another within the computer 13 to perform the various functions described herein. In yet another example, the resource manager 12 may comprise a computer program product including a computer-readable medium and computer program logic encoded thereon that when executed in the computer 13 performs the various functions described herein.

The device tree 14 includes a root node 16 and a plurality of device nodes 18. Each device node 18 is generally defined as at least one slot (not shown) within the computer 13 that is operably coupled to one or more hardware based devices. The device nodes 18 as illustrated in FIG. 1 may be broken down into various rows. For example, row 1 includes device nodes (1-1)-(1-5); row 2 includes device nodes (2-1)-(2-7); row 3 includes device nodes (3-1)-(3-10), and row 4 includes device nodes (4-1)-(4-10). For purposes of description, the nodes 18 in the tree 14 may establish familial relationships with one another. For example, device node (1-1) may be defined as a parent to device nodes (2-1)-(2-3), a grandparent to device node (3-5), and a great grandparent to device nodes (4-4)-(4-5). The relevance of the relationships of the device nodes with respect to one another will be described in more detail below.

The root node 16 and the device nodes 18 are operably coupled to one another via a bus system 20. The bus system 20 enables communication between a central processing unit (CPU) (not shown) in the computer 13 and the devices of the device nodes 18. In one example, the bus system 20 may be implemented as a Peripheral Component Interconnect (PCI) bus or other suitable variant thereof such as, but not limited to, PCIe and PCIX.

In one example, the slots of the device nodes 18 may receive various ICs (or other planar devices) generally fitted on a motherboard of the computer. In another example, the slots of the device nodes 18 may be implemented as a socket for receiving various expansion cards. In such cases, the ICs and the expansion cards are generally defined as devices. The devices of the device nodes 18 may comprise a bridge (or switch) or an endpoint device (such as, but not limited to, network cards, storage device, or universal serial bus (USB) adapters, etc.). A PCI controller (not shown) operates with the PCI bus 20 to enable communication and/or data exchange between the devices of the device nodes 18 and the CPU. It is known that the PCI bus 20 may be operably coupled to non-PCI based buses within the computer system. Such non-PCI based busses and their corresponding adapters may be defined as leaf devices with their various device nodes 18. Examples of leaf devices may include, but not limited to, a USB bus adapter, an Industry Standard Architecture (ISA) bus adapter, a Cardbus adapter, and an Express Card adapter.

In general, when the computer 13 is powered on, the BIOS/OBP allocates resources for all on-board devices of the device nodes 18. However, when a device is hot-plugged (e.g., hot-plugged device 19) into a particular slot (e.g., a hot-plugged device node), there may not be enough available resources that can be provided to the hot-plugged device 19. It may be necessary to find such resources from parent or other upper level device nodes so that the resources can be provided to the hot-plugged device 19. The hot-plugged device 19 is generally defined as a device that is plugged into the slot after the BIOS/OBP has allocated resources for the on-board device nodes.

The resource manager 12 coacts with the device tree 14 to find the available resources and to provide the resources to the hot-plugged device 19. In the event the resource manager 12 is unable to locate the resources needed by the hot-plugged device 19, the resource manager 12 performs a re-balance operation to obtain the needed resources for the hot-plugged device 19. The various resources that may be allocated or provided to the hot-plugged device 19 may include, but not limited to, available bus numbers, I/O addresses, memory addresses, and/or pre-fetchable memory addresses.

Figure 2:
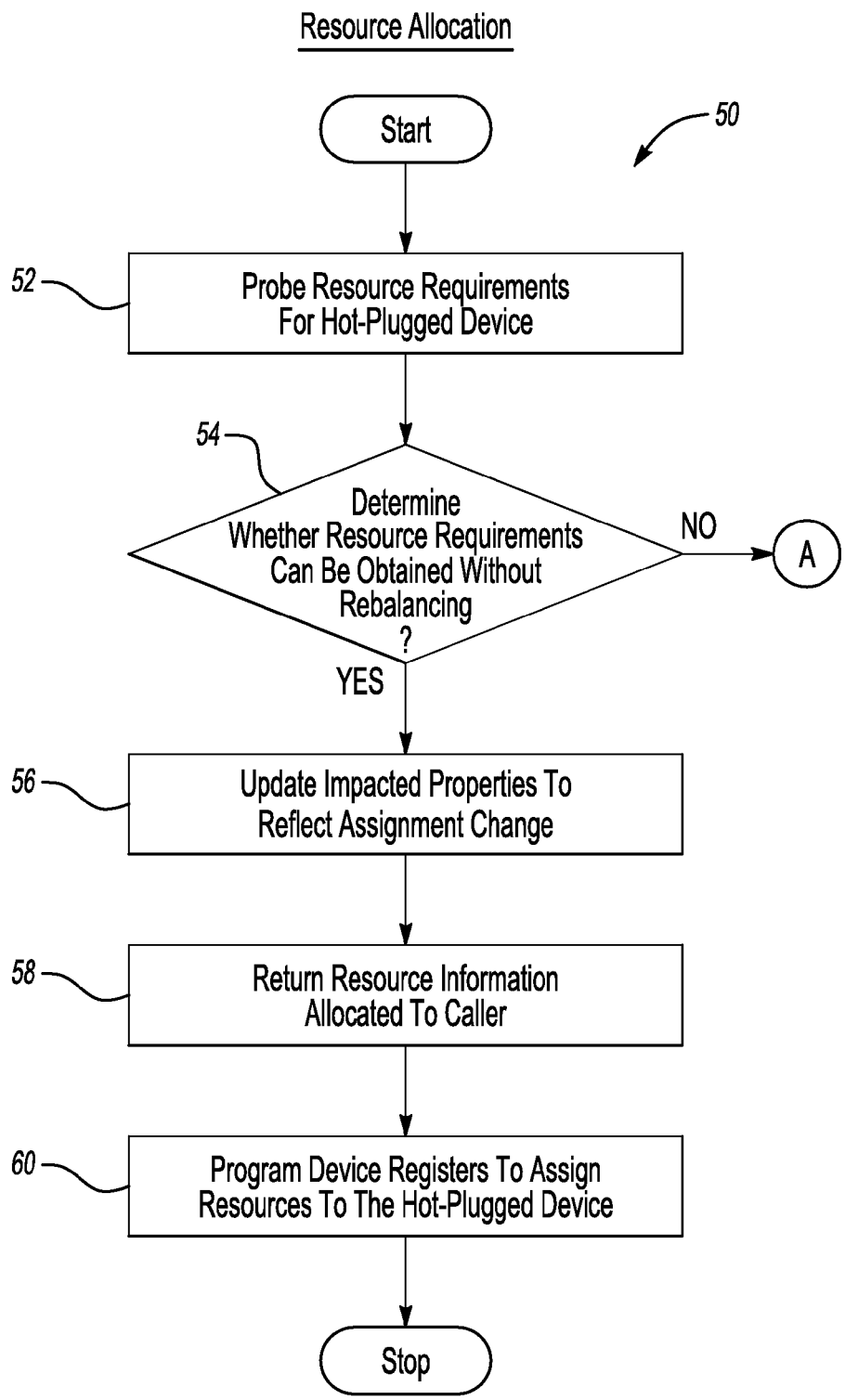
FIG. 2 depicts a method for allocating resources for a hot-plugged device in accordance to one embodiment of the present invention.

FIG. 2 depicts a method 50 for allocating resources for the hot-plugged device 19 in accordance to one embodiment of the present invention. In operation 52, the resource manager 12 receives the resource requirements from the hot-plugged device 19. In general, each device includes properties which indicate the type of resources that are used by that particular device. As noted above, the hot-plugged device 19 may need resources to operate in the manner intended. Such resources may include, but not limited to, various available bus numbers, I/O addresses, memory addresses, and/or prefetchable memory addresses. In one example, a bridge/switch based device may request a continuous bus range. The leaf device nodes may also request I/O addresses, memory addresses, and/or prefetchable memory addresses.

An operating system (e.g., typically device drivers) detects the presence of the hot-plugged device 19 once inserted into the slot. The resource manager 12 receives the desired resources requirements from the hot-plugged device 19. The resource manager 12 probes the available resources of the parent node to the hot-plugged device node to locate the resources needed by the hot-plugged device 19. In one example, in the event the hot-plugged device 19 requires a particular group of addresses, the resource manager 12 may calculate such addresses or determine the availability of such addresses based on alignment, base, length, or other suitable information read by or received from properties of the hot-plugged device 19.

The following example describes the manner in which the resource manager 12 calculates a particular group of addresses that are needed for the hot-plugged device 19. If the hot-plugged device 19 requires a memory space of length 0x2000 bytes, then the resource manager 12 identifies the alignment for the resource requirement to be that of 0x2000 bytes. The resource manager 12 then checks the available memory addresses in the immediate parent node to the node containing the hot-plugged device 19. If the resource manager 12 determines that a range of available memory exists (e.g., memory address starting at 0x123000 to 0x127999), then the resource manager 12 allocates the address from base 0x124000 to 0x125999 for the hot-plugged device 19. The alignment requirement is met because the base 0x124000 is an integral multiple of the requested length 0x2000.

Each hot-plugged device 19 is probed and programmed by a PCI configurator. The PCI configurator is generally defined as logic within the operating system which enables communication with the resource manager 14 or other suitable interfaces within the computer 13. The PCI configurator is configured to probe and program the devices.

In operation 54, the resource manager 12 determines whether the requested resource requirements from the hot-plugged device 19 can be obtained without re-balancing. For example, the resource manager 12 checks the device node that is immediately above the hot-plugged device node to determine if there are enough resources to satisfy the resource requirements for the hot-plugged device 19. If there are enough resources available from the parent node, then the method 50 moves to operation 56. If there are not enough resources available in the parent node, then the method 50 moves to method 100 to perform a re-balance operation. The re-balance operation will be discussed in more detail in connection with FIG. 3.

In operation 56, the resource manager 12 updates the properties for the device of the parent node to reflect any assignment changes that may occur as a result of providing resources to the hot-plugged device 19. Likewise, the resource manager 12 updates the properties for the hot-plugged device 19 to reflect assignment changes that will occur when the hot-plugged device 19 receives the desired resources.

In operation 58, the resource manager 12 returns the resource information (e.g., base and length) to the PCI configurator (or caller).

In operation 60, the PCI configurator programs device registers contained within the hot-plugged device 19 to assign the newly received resources thereto.

An example of a resource request from the PCI configurator of the hot-plugged device 19 to the resource manager 12 is shown below:

```
typedef struct pcrim__res__req {
    enum type;          /IO/MEM/PMEM/Bus num */
    uint_t flags;       /*General flags      */
    uint64_t len;       /*Requested allocation length */
```

-continued

```
        uint64_t addr;          /*Specific base address requested*/
        uint64_t boundbase;     /*Base address of the area for */
                                /*the allocated resource to be */
                                /*restricted to.        */
        uint64_t boundlen;      /*Length of the area, starting */
                                /*from ra_boundbase, for the */
                                /*allocated resource to be */
                                /*restricted to. */
        uint64_t align_mask;    /*Alignment mask used for */
                                /* allocated base address */
        struc_pcirm_res_req*next;
} pcirm_res_req_t
```

An example of a request from the resource manager 12 return allocated resources to the PCI configurator of the hot-plugged device is shown directly below:

```
        typedef struct pcirm_res {
                enum type;
                uint64_t base;
                unit64_t len;
                stuct pcirm_res*next;
        } pcirm_res_t.
```

Figure 3:
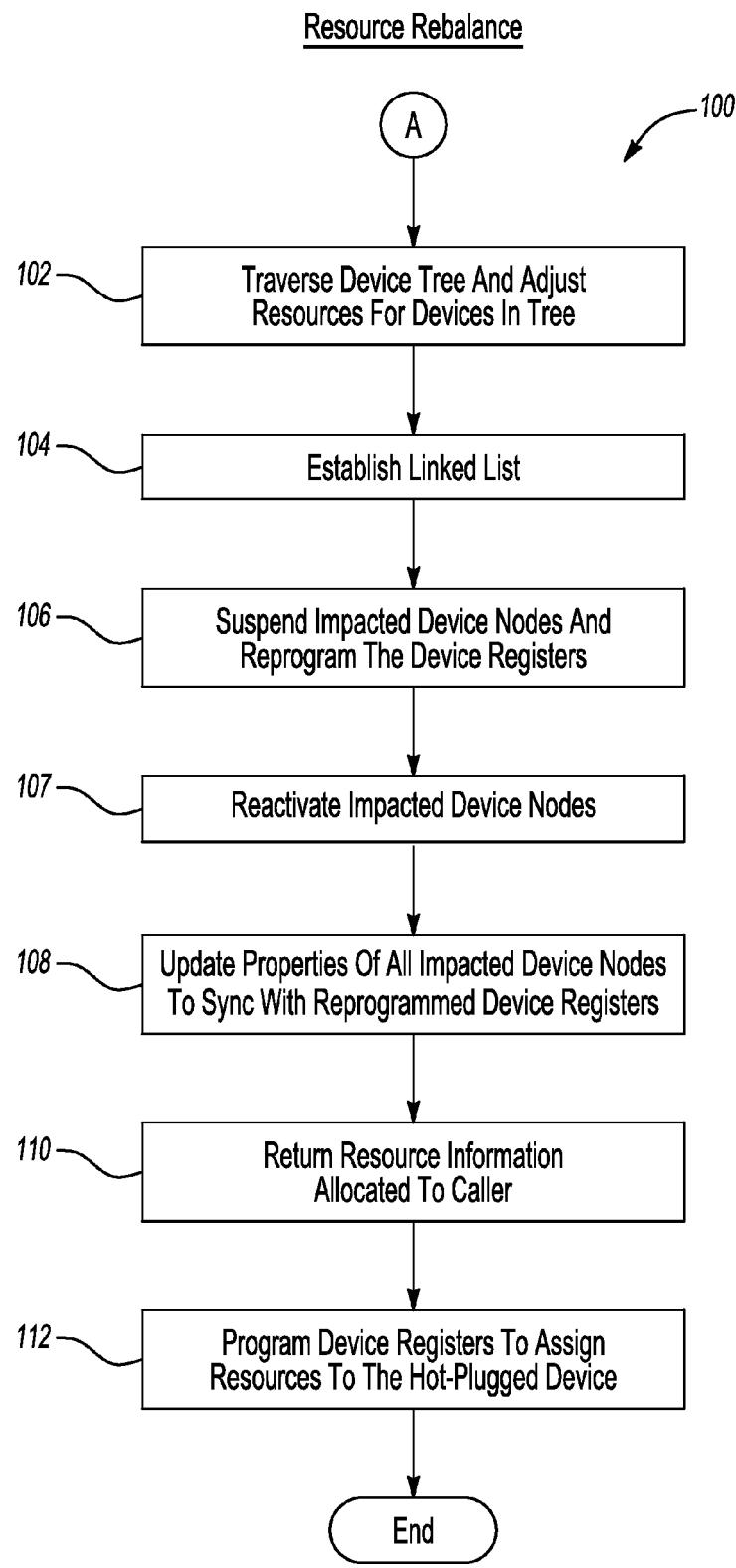
FIG. 3 depicts method for re-balancing resources from one or more devices to allocate such resources to the hot-plugged device in accordance to one embodiment of the present invention.

FIG. 3 depicts a method 100 for re-balancing resources in accordance to one embodiment of the present invention. In operation 102, the resource manager 12 traverses the nodes 14 that may be a grandparent node or greater to the node 18 that contains the hot-plugged device 19. Such grandparent or greater nodes to the hot-plugged device 19 are generally defined as upper level nodes. In general, the resource manager 12 may identify which resources will be modified or moved from devices in the parent and/or upper level device nodes to obtain the resource requirements for the hot-plugged device 19. For example, the re-balance operation may identify that the bus ranges may be modified for existing devices in the parent and upper level nodes, or that I/O and memory addresses may be moved from a device in the parent and the upper level nodes to meet the resource requirements for the hot-plugged device.

In operation 104, the resource manager 12 generates a linked list to account or track the details regarding the expected movement of resources (or resource re-assignment) between the devices (including the on-board devices and/or the hot-plugged device 19) in the device tree 10. For example, the linked list may contain information which details the manner in which the bus ranges may be modified for the affected devices in the device tree 10 or tracks the expected reassignment of the previously assigned I/O addresses and/or memory addresses of the various device nodes 18.

In operation 106, the resource manager 12 communicates with the PCI configurator so that each device suspends its operation thereof. The PCI configurator programs various registers in the affected devices of the parent and upper level nodes to reflect the resource assignment that may occur in response to the modification or movement of the resources identified in operation 102.

In operation 107, the PCI configurator reactivates the operation of the suspended devices after reprogramming.

In operation 108, the PCI configurator updates the properties for each affected (or impacted) device (including the hot-plugged device 19) to sync up to the new resources as established in operation 106.

In operation 110, the resource manager 12 returns (or provides) the resource information (e.g., base and length) to the PCI configurator.

In operation 112, the PCI configurator programs the device registers contained within the hot-plugged device 19 to assign the newly received resources from the devices of the parent and the upper level nodes (including the from the parent node if applicable) thereto.

An example of the allocation and re-balance operations performed by the resource manager 12 is set forth directly below in reference to FIG. 1. The hot-plugged device 19 may be inserted into slot to form the hot-plugged device node 22 that is positioned between device node (3-5) and device nodes (4-4) and (4-5). The resource manager 12 probes the device node (3-5) to determine if there are enough resources available to support the resources needed by the hot-plugged device 22. Assuming for example, the resource manager 12 cannot find enough resources for the hot-plugged device node 22 in the device node (3-5), the resource manager 12 determines that a re-balance operation is to be performed.

The resource manager 12 traverses the device nodes 18 above the hot-plugged device node 22 (e.g., nodes (1-1), (2-1), (2-2), (2-3), (3-5) and (4-4) to locate the desired resources for the hot-plugged device 19. The resource manager 12 determines that there are enough resources available from the device nodes above the hot-plugged device node 22 to allocate to the hot-plugged device node 22. Because resources may be moved or assigned from the parent and upper level device nodes (1-1), (2-1), (2-2), (2-3), (3-5) and (4-4), the device positioned within such device nodes have to be programmed to reflect the resource reassignment changes. The resource manager 12 sets up a linked list for the device nodes (1-1), (2-1), (2-2), (2-3), (3-5), and (4-4) that need to be reprogrammed to reflect that resources from the device nodes will be made available to the hot-plugged device node 22. Prior to programming the resource assignment changes for the device nodes (1-1), (2-1), (2-2), (2-3), (3-5), and (4-4), the resource manager 12 suspends the operation of all of the devices under the device node (1-1), including the device in the device node (1-1). In general, the entire sub-tree under node (1-1) is suspended because every child or grand-child under node (1-1) may be impacted by the reprogramming.

The PCI configurator follows the linked list to reprogram the device nodes (1-1), (2-1), (2-2), (2-3), (3-5), and (4-4) to reflect the resource re-assignment from the parent and the upper level device nodes to the hot-plugged device node 22. After the devices of nodes (1-1), (2-1), (2-2), (2-3), (3-5), and (4-4) have been reprogrammed, the resource manager 12 resumes the operation of all the device nodes under node (1-1), including node (1-1) itself, and communicates with the PCI configurator to reprogram registers of the hot-plugged device 19 with the resources provided from the device nodes under node (1-1). As shown in FIG. 1, the hot-plugged device node 22 may include device nodes (4-11), (5-1), (6-1), and (6-2). In one example, device nodes (4-11) and (5-1) may correspond to various switches, perhaps an expansion to the PCI bus 22 and that the device nodes (6-1) and (6-2) may each comprise an end-point device.

For each device node that needs to be reprogrammed, there may be more than one portion of resources that need to be moved. The following data structure is defined for a portion of the resources to be moved:

```
typedef struct pcirm_rbl_map {
    enum            type;           /* The type of resource to be moved */
    int             reg_num;        /* The BAR # to be reprogrammed */
    uint64_t        base;           /* The base of the resource to be moved. */
    uint64_t        length;         /* The length of the resource to be moved. */
    uint64_t        new_base;       /* The resource's target base after moved. */
    uint64_t        new_length;     /* The resource's target length after moved. */
    pcirm_rbl_map_t *next;          /* Next resource to be moved. */
} pcirm_rbl_map_t
```

Figure 4:
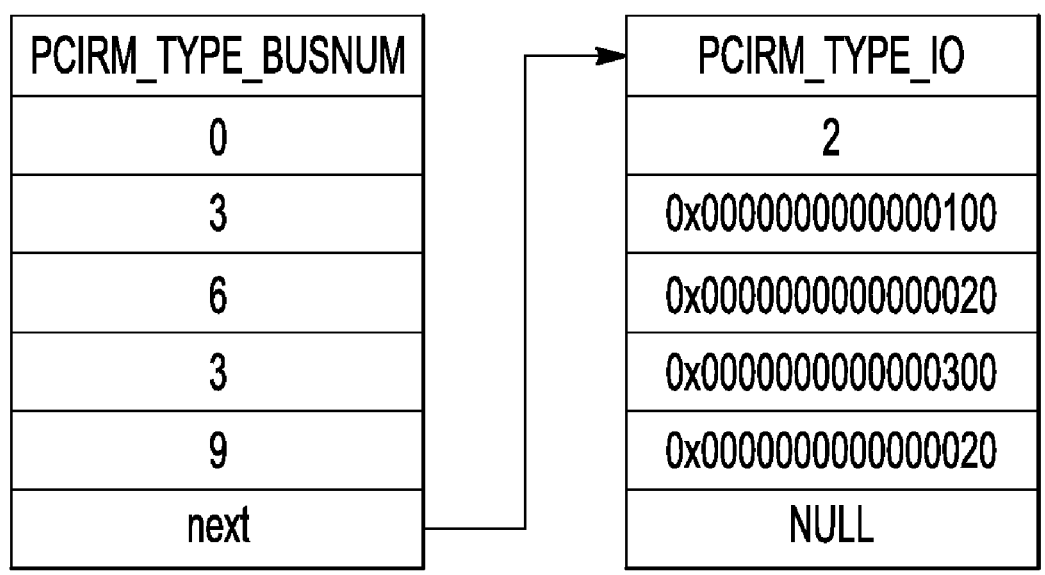
FIG. 4 depicts an example of the manner in which a labeled list may be set up by the resource manager.

In continuing reference to the above example provided for moving resources from nodes (1-1), (2-1), (2-2), (2-3), (3-5), and (4-4) to the hot-plugged device node 22, FIG. 4 illustrates the manner in which a linked list may be setup to indicate how to move bus numbers, I/O addresses and memory addresses from one of the nodes (e.g., node (1-1)). The linked list as illustrated in FIG. 4 indicates that, for node (1-1), the bus number from 3-8 will be changed, and that the I/O addresses from 0x100-0x120 will be changed from 0x300-0x320, and this needs to reprogram the second Base Address Register (BAR) of node (1-1). After the reprogramming is done, more resources may be available for the children of node (1-1). Node (2-1) will then be updated according to the linked list attached to it and so on. Eventually all impacted nodes will be reprogrammed. By then, more resources will be available at node (3-5) which is the parent node to the hot-plugged device 19. That is, enough resources will then be made available for the hot-plugged device 19 to work as intended.

The resource manager 12 generally sets up a re-balance map while traversing the upper level nodes to the hot-plugged device node 22 to track the device nodes (e.g., device nodes (1-1), (2-1), (2-2), (2-3), (3-5), and (4-4) as referenced in the above example) that may require a resource assignment change as a result of the device node (1-1), (2-1), (2-2), (2-3), (3-5), and (4-4) providing resources to the hot-plugged device node 22.

To support the re-balance map, a pointer may be added to dev_info_t structure as illustrated with the below example:

```
/*
 * Null if this device node is not in the re-balance map
 * Point to the next device node to be re-programmed
 * Point to itself if this is the last device in the re-balance map
 */
dev_info_t *pcirm_next_rebl;
```

The above pointer links the device node (1-1), (2-1), (2-3), (3-5) and (4-4) and acts a flag to indicate if a device node is in the re-balance map. If the pointer is NULL, such a condition indicates that the device node may not need to be re-programmed for re-balance.

To support the Table 1 as described above, an additional pointer may be added to the dev_info_t structure as illustrated the below example:

```
/*
 * re-balance map of this device node. It is a linked list for all the
 * resources to this device node to be moved.
 */
pcirm_rbl_map_t *rbl_map;
```

In general, the above discloses that if the device node is not in the re-balance map, then no resources from this particular device node has to be moved for during the re-balance operation.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for providing resources from a plurality of on-board device nodes to a hot-plugged device node in a computer, the apparatus comprising:
   a resource manager being operably coupled to a device tree including the plurality of on-board device nodes and the hot-plugged device node, the resource manager being configured to:
      receive information indicative of a set of desired resources for the hot-plugged device node;
      probe a parent device node positioned immediately above the hot-plugged device node to determine if the parent device node is capable of providing the set of desired resources to the hot-plugged device node;
      probe the parent device node and at least one upper level device node positioned above the parent device node for the set of desired resources if the parent device node is incapable of providing the set of desired resources to the hot-plugged device node;
      generate a linked list to indicate the movement of the set of desired resources from the parent node device and the at least one upper level device node to the hot-plugged device node;
      provide the set of desired resources from the parent device node and the at least one upper level device node over a bus system for transmission to the hot-plugged device node to enable the hot-plugged device node to operate in the intended manner; and
      communicate with a caller to suspend the operation of the parent device node and the at least one upper level device node prior to the hot-plugged device node receiving the set of desired resources.

2. The apparatus of claim 1 wherein each of the on-board device nodes and the hot-plugged device node comprise a peripheral component interconnect (PCI) based device.

3. The apparatus of claim 1 wherein the bus system is a peripheral component interconnect (PCI) based bus system.

4. The apparatus of claim 1 wherein the hot-plugged device node is defined as a device node that is detected to be in the computer after a basic input/output system (BIOS) within the computer allocates resources for the plurality of on-board device nodes.

5. The apparatus of claim 1 wherein the caller accesses the linked list to reprogram the parent device node and the at least one upper level device node to reflect that the set of desired resources will be made available to the hot-plugged device node.

6. The apparatus of claim 5 wherein the resource manager is further configured to update properties for the parent device node, the at least one upper level node, and the hot-plugged device node to reflect that the set of desired resources will be made available to the hot-plugged device node.

7. The apparatus of claim 1 wherein the caller is a PCI configurator.

8. The apparatus of claim 1 wherein the set of desired resources provided by the parent device node and the at least one upper level device node to the hot-plugged device node comprise one or more of input/output (I/O) addresses, memory addresses, and bus numbers.

9. A method for providing resources from a plurality of on-board device nodes to a hot-plugged device node in a computer having a device tree including the plurality of on-board devices and the hot-plugged device node, the method comprising:
   providing a set of desired resources for the hot-plugged device node;
   probing a parent device node positioned immediately above the hot-plugged device node to determine if the parent device node is capable of providing the set of desired resources to the hot-plugged device node;
   probing the parent device node and at least one upper level device node positioned above the parent device node for the set of desired resources if the parent device node is incapable of providing the set of desired resources to the hot-plugged device node;
   transmitting the set of desired resources from the parent device node and the at least one upper level device node over the bus system to the hot-plugged device node to enable the hot-plugged device node to operate in the intended manner;
   generating a linked list to indicate the movement of the set of desired resources from the parent node device and the at least one upper level device node to the hot-plugged device node; and
   communicating with a caller to suspend the operation of the parent device node and the at least one upper level device node prior to transmitting the set of the desired resources from the parent device node and the at least one upper level device node.

10. The method of claim 9 wherein the hot-plugged device node is defined as a device node that is detected to be in the computer after a basic input/output system (BIOS) within the computer allocates resources for the plurality of on-board device nodes.

11. The method of claim 9 wherein generating the linked list is performed prior to transmitting the set of the desired resources from the parent device node and the at least one upper level device node.

12. The method of claim 9 further comprising accessing, with the caller, the linked list to reprogram the parent device node and the at least one upper level device node to reflect that the set of desired resources will be made available to the hot-plugged device node.

13. The method of claim 9 further comprising reactivating the operation of the parent device node and the at least one upper level device node after reprogramming the parent device node and the at least one upper level device node.

14. The method of claim 13 further comprising updating properties for the parent device node, the at least one upper level node, and the hot-plugged device node to reflect that the set of desired resources will be made available to the hot-plugged device node.

15. The method of claim 9 wherein transmitting the set of desired resources from the parent device node and the at least one upper level device node further comprises transmitting input/output (I/O) addresses, memory addresses, and bus numbers from the parent device node and the at least one upper level device node.

16. An apparatus for providing resources from a plurality of on-board device nodes to a hot-plugged device node in a computer, the apparatus comprising:
   a resource manager being operably coupled to a device tree including the plurality of on-board device nodes and the hot-plugged device node, the resource manager being configured to:
      determine a set of desired resources for the hot-plugged device node;
      probe a parent device node and at least one upper level device node positioned above the parent device node for the set of desired resources;
      generate a linked list to indicate the expected movement of the set of desired resources from the parent node device and the at least one upper level device node to the hot-plugged device node;
      provide the set of desired resources from the parent device node and the at least one upper level device node over a peripheral component interconnect (PCI) bus system for transmission to the hot-plugged device node to enable the hot-plugged device node to operate in the intended manner; and
      communicate with a caller to suspend the operation of the parent device node and the at least one upper level device node prior to the hot-plugged device node receiving the set of desired resources.

17. The apparatus of claim 16 wherein each of the on-board device nodes and the hot-plugged device node each comprise a peripheral component interconnect (PCI) based device, and wherein the set of desired resources provided by the parent device node and the at least one upper level device node to the hot-plugged device node comprise input/output (I/O) addresses, memory addresses, and bus numbers.

18. The apparatus of claim 1 wherein the resource manager is further configured to generate the linked list prior to providing the set of desired resources from the parent device node and the at least one upper level device node.

* * * * *

UNITED STATES PATENT AND TRADEMARK OFFICE
CERTIFICATE OF CORRECTION

| | | |
|---|---|---|
| PATENT NO. | : 8,032,682 B2 | Page 1 of 1 |
| APPLICATION NO. | : 12/501817 | |
| DATED | : October 4, 2011 | |
| INVENTOR(S) | : Yong Colin Zou et al. | |

It is certified that error appears in the above-identified patent and that said Letters Patent is hereby corrected as shown below:

On the Title Page (75) Inventors:

Delete the second-named inventor: "Wesley M. Shao"
and insert -- Wesley W. Shao --

Signed and Sealed this
Sixth Day of March, 2012

David J. Kappos
*Director of the United States Patent and Trademark Office*